DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 21, 1970

873 O.G. 687

T873,012
PROPIOLACTONE-CYCLIC SULFIDE COPOLYMERS

Frank B. Moody, West Chester, Pa., assignor to E. I. du Pont de Nemours and Company, Wilmington, Del.

Filed Aug. 18, 1969, Ser. No. 851,064
Int. Cl. C08g *17/017*
U.S. Cl. 260—78.3
No Drawing. 12 Pages Specification

Cyclic sulfides are used as initiators and form copolymers with 2,2-disubstituted propiolactones; especially pivalolactone. Typical cyclic sulfides used are thiethane; 3,3-dialkylthiethanes; tetrahydrothiophene and substituted tetrahydrothiophenes; tetrahydrothiapyran; and thiacycloheptane. Generally about 0.01 to 10 mole percent is used to initiate the polymerization in solution or in bulk. The resultant polymers are useful in the preparation of shaped articles (e.g., fibers).